Feb. 13, 1940.  J. A. CERNY  2,189,881
THERMOSTATIC VALVE MECHANISM
Filed Aug. 3, 1937  2 Sheets—Sheet 1
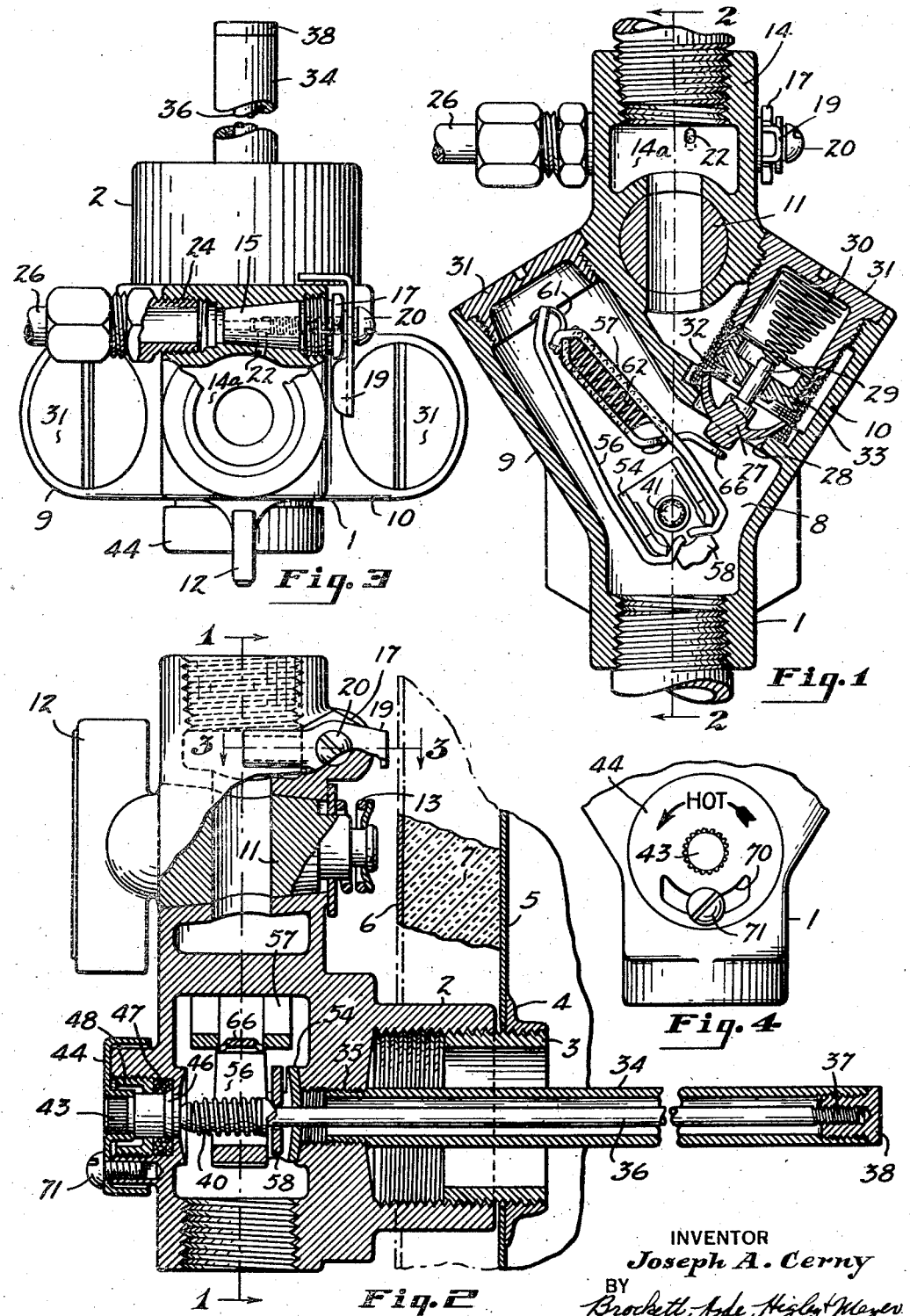
INVENTOR
Joseph A. Cerny
BY
Brockett, Ayde, Higley & Meyer
ATTORNEYS Feb. 13, 1940. J. A. CERNY 2,189,881
THERMOSTATIC VALVE MECHANISM
Filed Aug. 3, 1937 2 Sheets-Sheet 2
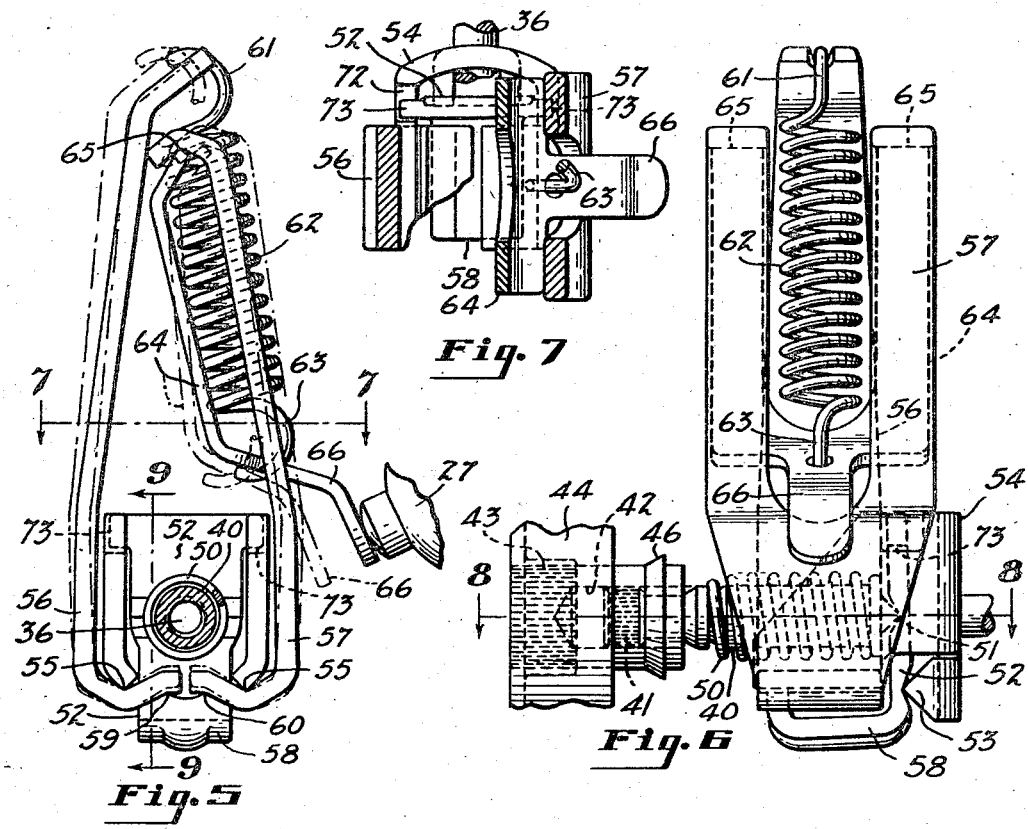
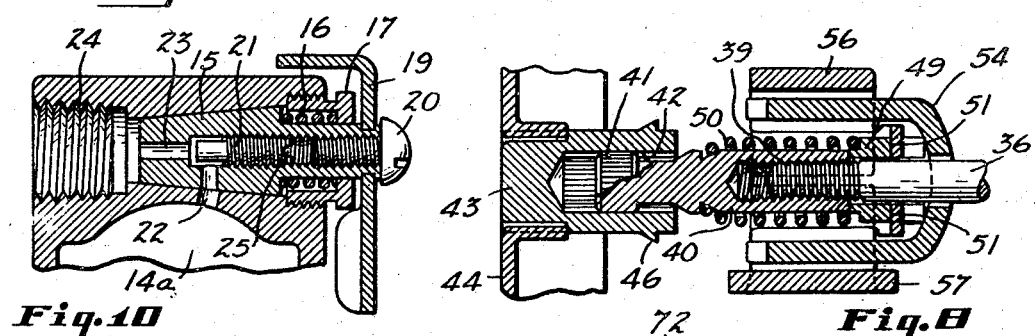
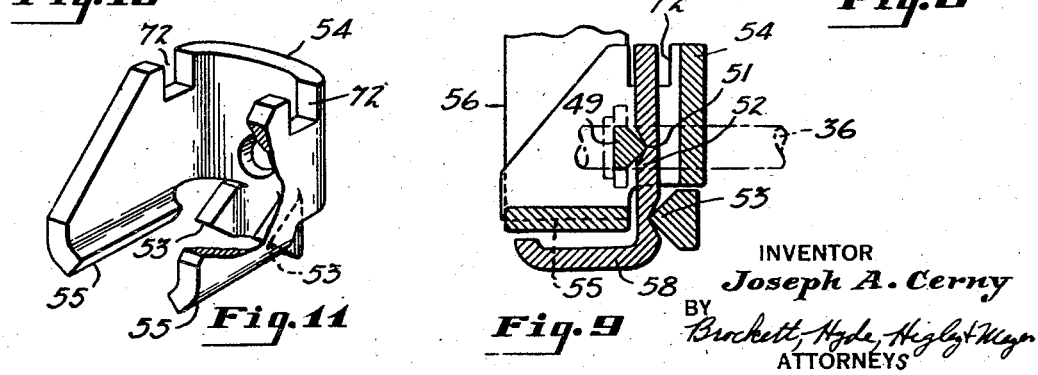
INVENTOR
Joseph A. Cerny
BY
Brickett, Hyde, Higley & Meyer
ATTORNEYS Patented Feb. 13, 1940

2,189,881

UNITED STATES PATENT OFFICE 2,189,881

THERMOSTATIC VALVE MECHANISM

Joseph A. Cerny, Cleveland, Ohio, assignor to The Titan Valve and Manufacturing Company, Cleveland, Ohio, a corporation of Ohio Application August 3, 1937, Serial No. 157,150

11 Claims. (Cl. 236—48)

This invention relates to thermostatic valve mechanism, such as is used for controlling the flow of gas to a fuel burner used for heating water, as in connection with domestic hot water heating, where the mechanism is sensitive to the temperature of the water to be heated.

One object of the invention is to provide improved mechanism of this kind which is of compact form and of reduced over-all length and so arranged that when installed on a water boiler all the parts lie very close to the boiler and do not project out therefrom so far as with previous constructions for the same purpose.

A further object of the invention is to provide improved mechanism of this kind arranged to afford convenient access to the inner parts for installation, replacement or repair.

A further object is to provide improved mechanism of the snap action type including two levers connected by a spring, both of said levers being movable at both ends, both being operated at one end by the thermostatic control devices, and the two levers and spring, by their joint operation, actuating a valve operating lever with snap action.

A further object of the invention is to provide improved valve mechanism of this kind in which the valve and valve operating lever have motion in a plane transverse to the axis of the thermostatic rod instead of generally in line with or parallel to the length of said rod, as in prior constructions.

A further object is to provide valve mechanism of this kind including in one mechanism not only the thermostatic snap action control mechanism and valve, but also the main valve or gas cock ordinarily referred to as the A valve and also another valve for controlling a pilot line, ordinarily referred to as the B valve, the entire construction nevertheless being compact and of minimum size.

A further object is to provide valve mechanism of the kind described, including snap action devices, and in which the adjustment for temperature is a rotatable member coaxial with the thermostatic elements and accessible at the front of the valve casing.

A further object is generally to improve the valve mechanism, secure certainty and uniformity in operation, provide ready accessibility to all parts for adjustment or repair, and to secure other advantages as will be more fully apparent hereinafter.

Further objects are in part obvious and in part will appear more clearly from the description to follow.

In the drawings Fig. 1 represents a sectional elevation on the line 1—1, Fig. 2, through valve mechanism embodying the invention;

Fig. 2 is a sectional elevation on the line 2—2, Fig. 1;

Fig. 3 is a plan view partly in section on the line 3—3, Fig. 2, the pilot valve plug being shown in plan view;

Fig. 4 is an end elevation from the left in Fig. 2, showing the temperature regulating device;

Fig. 5 is an enlarged detail view, corresponding to Fig. 1, and showing certain of the operating levers and other mechanism;

Fig. 6 is a side elevation from the right in Fig. 5;

Fig. 7 is a sectional plan view on approximately the line 7—7, Fig. 5;

Fig. 8 is a detail sectional plan view on the line 8—8, Fig. 6;

Fig. 9 is a sectional detail elevation on approximately the line 9—9, Fig. 5;

Fig. 10 is a detail sectional plan view, corresponding to Fig. 3, but also showing the valve plug and inner parts in section; and Fig. 11 is a detail perspective view, illustrating a supporting member.

The valve mechanism shown in the drawings comprises a hollow casing or body 1 provided with a base connection 2, shown as internally threaded, for connection to the water tank, such as by threaded connection to a nipple 3 screwed into a spud 4 on the tank 5. 6 illustrates an outer casing or jacket for the tank, spaced from the tank wall 5 by insulation 7, Fig. 2 illustrating how the valve parts in the present construction may be brought and lie very close to the jacket 6. The valve body 1 is provided with an inner chamber 8 extending into hollow arms 9, 10 lying at an angle to each other, the arm 9 enclosing the lever mechanism and the arm 10 the valve mechanism, as shown in Fig. 1. Above and between the arms 9 and 10 the casing is provided with an opening to receive a tapered gas cock 11 having an operating head 12 exposed at the front of the valve mechanism and held to its seat by a spring 13, Fig. 2. This valve 11 is the A valve and its port controls flow of gas from the supply connection 14 to the chamber 8 by way of the valve in the hollow arm 10, as will later appear.

On the line side of the valve 11 is located a B valve for a pilot line. This valve, shown in Figs. 3 and 10, comprises a tapered plug 15, said plug being held to its seat by a spring 16 enclosed in a hollow plug 17. Attached to the outer end of the plug is an operating head or handle 19 non-rotatably secured to the plug beneath the head of a screw 20, removal of which affords access to a channel within the plug in which is threaded a small volume adjusting plug 21, the inner end of which may be adjusted to more or less restrict the flow of gas from the supply channel 16a by way of a port 22 and through a channel 23 in the plug to a connection 24 to the pilot line 26 (Fig. 3). By removing screw 20 a screwdriver may be inserted into the slot 25 of member 21 for adjusting it to control the flow through the pilot line, the screw 20 being restored to enclose and conceal the plug to prevent unauthorized manipulation of this adjusting device.

By rotating the plug 15 by its handle 19 flow through the pilot line may be permitted or wholly shut off, as will be obvious.

As before stated, hollow arm 10 encloses the thermostatically operated valve, which may be of ordinary form. It is shown as including a valve 27 cooperating with a seat at the edges of a port or opening 28, said valve being mounted on a stem 29 and normally held to its seat by a spring 30 enclosed within a plug 31 threaded into the casing. On said plug is sleeved a filter screen 32 and within it is threaded a guide 33 having an opening through which the valve stem slides. By unscrewing the plug 31 the valve, screen, plug, guide, and spring may be removed as a unit for replacement, adjustment or repair.

The thermostatic elements may be of any suitable form and as shown comprise a member relatively expansible by heat, such as the copper tube 34 threaded at 35 into the casing, and a member relatively non-expansible by heat, such as the steel rod 36 threaded at 37 into a plug 38 threaded into tube 34. The inner end of rod 36 is threaded at 39 into an adjusting member 40 provided at its outer end with a head 41 longitudinally ribbed to correspond with and sliding within ribs in a recess 42 of an operator 43 provided with a head 44 accessible at the outside of and at the front of the casing. Member 43 is rotatable in but is sealed within the casing wall, for which purpose it is provided with a tapered collar 46 (Fig. 2) to receive a packing 47 compressed by a gland nut 48. On the rod 36, at the inner end of member 40, is a ring 49 yieldingly pressed toward the casing wall by a compression spring 50. Said ring is provided on opposite sides of the rod 36 with knife edges 51 engaging seats in a generally L-shaped lever member 52 (Fig. 9) having recesses to receive knife edge bearing members 53 formed as tongues from a base member or support 54 which, generally speaking, in plan view is dish-shaped to fit the curve of the inner surface of the casing wall. The rod 36 extends through a hole in base 54 and the latter is held to its seat on the casing wall by the pressure of expansion of tube 34. The side walls of support 54 extend forwardly or into the gas chamber, their lower edges being bent inwardly to form fixed knife edges or bearing supports 55 which enter recesses in two levers marked 56, 57 respectively. As shown in Figs. 5 and 9, the lever 52 has a forwardly extending lower arm 58, the front end of which is formed to provide two bearing members, marked 59, 60, which respectively engage the short arms of the levers 56, 57. The long arms of said levers extend upwardly at an angle into the chamber within the arm 9, where lever 56 has connected to its free end a loop 61 of an extensible tension spring 62, a loop 63 at the other end of which is connected to a valve operating lever 64 having one end bent laterally to form a knife edge perched at 65 in a laterally extending portion of lever 57, while the other end 66 of the lever 64 lies opposite to the end of the valve 27 and has snap motion back and forth in the direction of the axis of said valve, as will appear.

Snap action or quick movement of lever 64, in one direction or the other, is produced by movement of its pivot point 65 back and forth across the dead center line connecting the two points where the ends of spring 62 are connected respectively to lever 56 and lever 64, in well known manner. Fig. 5 in full lines shows the parts in valve open position and in dotted lines in valve closed position. Assuming the parts in full line position, with the valve open, gas of course is flowing to the heater and the temperature of the water is rising. When the temperature rises to the degree determined by the setting of the thermostat, tube 34 expands and rod 36 moves to the right (as viewed in Figs. 8 and 9), carrying with it adjusting member 40 and the knife edge member 49, turning lever 52 around its bearing at 53 in the clockwise direction, thereby raising the outer end of its horizontal arm 58. Referring now to Fig. 5, upward movement of arm 58 turns the lever 57 clockwise and the lever 56 counter-clockwise, moving the pivot point 65 to the right in Fig. 5 until said pivot passes the dead center line aforesaid, when lever 64 moves by a snap action from the full line to the dotted line position, permitting the valve to close. The temperature of the water then will gradually fall until the predetermined low temperature limit is reached when the contraction of tube 34 causes reverse action of the same parts with snap movement of lever 64 in the opposite direction to the full line position, thereby opening the valve. This action occurs as follows: With the parts in the dot-dash position of Fig. 5 levers 57 and 64 are held there by the engagement of the end 66 of lever 64 with the lower, solid portion of lever 57. Spring 62, exerting a pressure on tongue 66 against the outer face of lever 57, tends to turn the latter counterclockwise but such movement is resisted at fulcrum 60. Spring 62 tends to turn lever 56 in a clockwise direction but this movement is resisted at fulcrum 59. As tube 34 contracts rod 36 moves toward the left as viewed in Figs. 8 and 9, causing counterclockwise movement of levers 52 and 57, and clockwise movement of lever 56 under the influence of spring 62. When the line of tension of the spring passes to the right of fulcrum 65 (as viewed in Fig. 5) snap movement of lever 64 counterclockwise to the full line position will occur, thus opening valve 27.

During variations in temperature of the water rod 36 moves endwise back and forth carrying with it member 40, but the splined or driving connection 41, 42 leaves unaffected the driving relation between member 40 and the adjusting device 43 with its operating head 44 accessible on the outside of the casing. Preferably said head is provided with a circumferential slot 70 to receive a securing screw 71, the ends of the slot limiting the adjusting movement in opposite directions, and the screw enabling head 44 to be clamped in any adjusted position. Also, the support 54, as shown in Fig. 11, is provided along its upper edge with recesses 72 to receive arms 73 (Fig. 5) on lever 52, an arrangement which enables the lever to be inserted into position in the support before assembly of said parts within the casing and prevents the parts from falling apart while being assembled.

Reference to Fig. 2 illustrates how comparatively shallow the outer casing and its contained parts is. In other words, both the levers and the valve are in the same plane and particularly a plane transverse to the axis of the thermostatic elements, instead of projecting endwise outwardly parallel to or alongside of the thermostatic elements. The total projection of the parts from the outer wall or shell of the water tank is therefore materially reduced.

Further, thermostatic movement is amplified a number of times, first in small measure by lever 52; second, by each of the levers 56, 57; and third, by the lever 64. All pivots are of the open variety, no pin pivots being used, thereby simplifying and reducing the cost of construction, in addition to which the arrangement is quite sensitive and may be made responsive to a very small range of temperatures.

Preferably the threaded connections between rod 36 and member 40, between rod 36 and plug 38 and between plug 38 and tube 34 are all of the same pitch, so that upon rotative adjustment of member 40 relative rotation at any of the threaded connections described will effect longitudinal adjustment of rod 36 for setting the device for temperature.

Further advantages of the invention will be apparent to those skilled in the art.

What I claim is:

1. Thermostatic valve mechanism, comprising a chambered casing, an actuating lever pivoted in said casing, two oppositely disposed intermediate levers pivoted in said casing and each having a short arm operated by said actuating lever, a valve operating lever pivoted on the long arm of one of said intermediate levers, a tension spring connecting said valve operating lever to the long arm of the other intermediate lever, and a valve operated by the valve operating lever.

2. Thermostatic valve mechanism, comprising a chambered casing containing a support, an actuating lever pivoted on said support, two oppositely disposed intermediate levers pivoted on said support and each having a short arm operated by said actuating lever, a valve operating lever pivoted on the long arm of one of said intermediate levers, a tension spring connecting said valve operating lever to the long arm of the other intermediate lever, and a valve operated by the valve operating lever, said intermediate and valve operating levers and said spring being so related that motion of both intermediate levers causes the pivot of the valve operating lever to move back and forth across the center line of said spring to produce snap action of said valve operating lever.

3. Valve operating mechanism of the class described, comprising a chambered casing having front and rear walls and two hollow arms diverging upwardly in a plane parallel to said walls, a thermostat rod entering the casing through an opening in its rear wall, adjusting means for said rod exposed on the front wall, a controlling valve in one arm, operating means connecting said rod and valve and extending into the other arm, a rotatable shut-off valve mounted in the casing between said two arms to turn about an axis parallel to said rod and controlling flow through a passage to said controlling valve, and a pilot valve also mounted in the casing beyond the shut-off valve and rotatable on an axis at right angles therewith.

4. Thermostatic valve mechanism, comprising a chambered casing, a valve, a thermostat rod, and operating connections between said rod and valve, including an actuating lever mounted on a fixed pivot and actuated by said rod, two intermediate levers also mounted upon fixed pivots and operated by said actuating lever, a valve operating lever pivoted upon one intermediate lever, and yielding means connecting said valve operating lever and the other intermediate lever.

5. Thermostatic valve mechanism, comprising a chambered casing provided with fuel supply and discharge connections, said casing having hollow arms whose axes intersect and lie in the same plane and diverge in Y form, the cavities in said arms communicating with the casing chamber, a valve in the cavity of one arm, valve operating mechanism in the cavity of the other arm, and thermostatic means including a rod extending into said casing at said intersection in a direction normal to said plane and operatively associated with said valve operating mechanism.

6. Thermostatic valve mechanism, comprising a chambered casing provided with fuel supply and discharge connections, said casing having hollow arms whose axes intersect and lie in the same plane and diverge in Y form, the cavities in said arms communicating with the casing chamber, a valve in the cavity of one arm, valve operating mechanism in the cavity of the other arm, thermostatic means including a rod extending into said casing at said intersection in a direction normal to said plane and operatively associated with said valve operating mechanism, and a shut-off valve mounted in the casing between said two arms and controlling fuel flow from said supply connection to said valve.

7. Thermostatic valve mechanism, comprising a chambered casing provided with fuel supply and discharge connections, said casing having hollow arms whose axes intersect and lie in the same plane and diverge in Y form, the cavities in said arms communicating with the casing chamber, a valve in the cavity of one arm, valve operating mechanism in the cavity of the other arm, thermostatic means including a rod extending into said casing at said intersection in a direction normal to said plane and operatively associated with said valve operating mechanism, a shut-off valve mounted in the casing between said two arms and controlling fuel flow from said supply connection to said valve, said casing having a front wall parallel to said plane, and separate means for adjusting said thermostatic means and for operating said shut-off valve extending through the front casing wall and being thereby exposed beyond the same for manual operation.

8. Thermostatic valve mechanism, comprising a chambered casing provided with fuel supply and discharge connections, said casing having hollow arms whose axes intersect and lie in the same plane and diverge in Y form, the cavities in said arms communicating with the casing chamber, a valve in the cavity of one arm, valve operating mechanism, including a main lever pivotally mounted in said chamber upon an axis parallel with said plane, and intermediate lever mechanism operated thereby and extending into the cavity of said other arm and movable back and forth in the direction of said plane and operating said valve, and thermostatic means including a rod extending into said casing at said intersection in a direction normal to said plane and engaging and operating said main lever.

9. In a device of the character described, the combination of a chambered casing, an actuating lever pivoted in said casing, two intermediate levers lying generally parallel and actuated thereby, said intermediate levers moving toward and from each other, a snap acting lever pivoted on one intermediate lever, yielding means extending from the free end thereof to the other intermediate lever, and a controlling device operated by said snap acting lever.

10. In a device of the character described, the combination of a chambered casing, an actuating lever pivoted in said casing, two intermediate levers lying generally parallel and actuated thereby, said intermediate levers moving toward and from each other, a snap acting lever pivoted on one intermediate lever, yielding means extending from the free end thereof to the other intermediate lever, and a controlling device operated by said snap acting lever, said actuating lever being pivoted on an axis parallel to the plane of motion of said intermediate levers.

11. In a device of the character described, the combination of a chambered casing, an actuating lever pivoted in said casing, two intermediate levers lying generally parallel and actuated thereby, said intermediate levers moving toward and from each other, a snap acting lever pivoted on one intermediate lever, yielding means extending from the free end thereof to the other intermediate lever, a controlling device operated by said snap acting lever, said actuating lever being pivoted on an axis parallel to the plane of motion of said intermediate levers, and a thermostatic element for operating the main lever and having a part engaging the same and moving in a direction normal to said plane.

JOSEPH A. CERNY.